(No Model.)
A. L. MUNSON.
PROCESS OF TREATING COAL TAR.
No. 440,830. Patented Nov. 18, 1890.
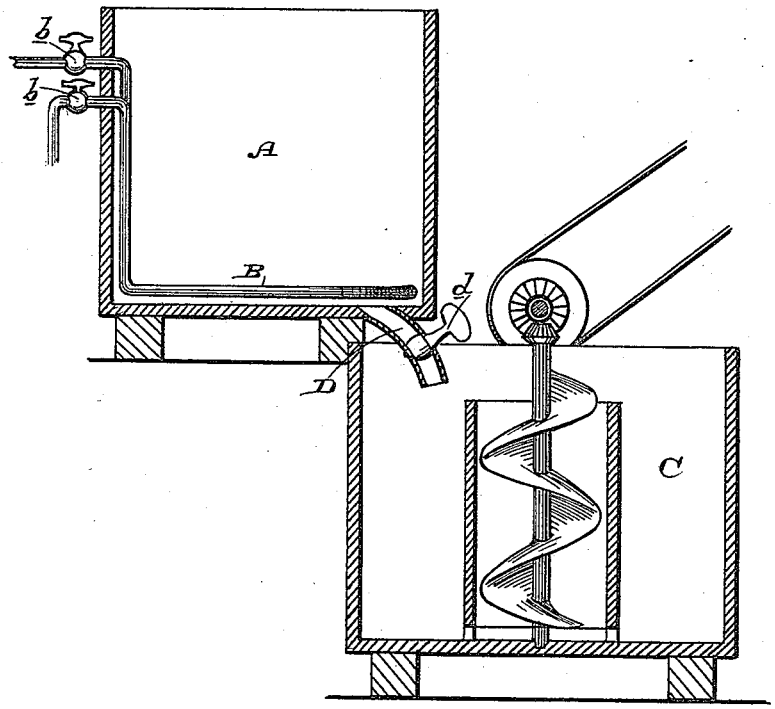
Witnesses,
Geo. H. Strong.
Inventor,
Anson L. Munson
By Dewey & Co.
atty

UNITED STATES PATENT OFFICE.

ANSON L. MUNSON, OF OAKLAND, CALIFORNIA.

PROCESS OF TREATING COAL-TAR.

SPECIFICATION forming part of Letters Patent No. 440,830, dated November 18, 1890.

Application filed April 15, 1890. Serial No. 348,052. (No specimens.)

*To all whom it may concern:*

Be it known that I, ANSON L. MUNSON, a citizen of the United States, residing at Oakland, Alameda county, State of California, have invented a new and useful Process of Treating Coal-Tar; and I hereby declare the following to be a full, clear, and exact description of the same.

My invention relates to the treatment of coal-tar.

It consists in the hereinafter-described novel process, the purpose of which is to make from the coal-tar a quick-drying oil, which may be used as a vehicle for paints.

A form of apparatus by which my process may be carried out is shown in the accompanying drawing, in which the figure is a vertical section.

A is a stationary receiving-vessel of any required capacity, containing a steam-coil B and connections b for applying steam heat.

C is a mixing-machine of ordinary pattern, located below the receiving-vessel, so that the material may flow from said vessel to the mixing-machine. The connection is made by a large pipe D, having a controlling-cock d.

The treatment of the coal-tar is effected with a saturated solution of chloride of zinc (by that I mean hydrochloric acid in which zinc is dissolved and free acid driven off by heat after the dissolution of the zinc) and with oil of turpentine.

The process is carried out as follows: The receiving-vessel is filled with coal-tar. Steam heat is then applied by means of the steam-coil until a temperature of not to exceed 110° Fahrenheit is reached. This temperature is maintained for about twenty minutes, the object being to avoid taking off the lighter volatiles and to melt the solids to a degree sufficient to be acted upon by the solvents. After the twenty minutes' heating at about 110° Fahrenheit the cock d is opened and the tar is quickly run off from the receiving-vessel through the large pipe D into the mixing-machine C, which may be run by steam-power or by hand or any other power, as may be desired. The mixing-machine is set in operation and about two and one-half pounds of the saturated solution of chloride of zinc to every fifty gallons of tar are put in while the tar is running from the receiving-vessel to the mixing-machine. After the entire mass has been agitated about ten minutes in the mixer five gallons of oil of turpentine to every fifty gallons of tar are gradually added while the mixer is in motion. The machine is kept in motion until the turpentine is thoroughly incorporated, and this completes the process.

Tar thus treated is permanently changed from a thick, viscid, or sticky mass into a limpid oil. The chloride of zinc acts as a deodorizer, and at the same time neutralizes the acids, and is also a partial solvent. Oil of turpentine is a solvent for all the constituents when applied as above stated.

Coal-tar thus prepared readily combines with metallic or mineral substances to form a quick-drying paint of great beauty and durability, and may be used as a marine paint and for iron and wood protective coatings and other purposes.

Having thus described my invention, what I claim as new, and desire to secure by Letters Patent, is—

1. The process of treating coal-tar, which consists in first subjecting the tar to a heat of 110° Fahrenheit and then adding to it a saturated solution of chloride of zinc and oil of turpentine, substantially as herein described.

2. The process of treating coal-tar, which consists in first subjecting the tar to a heat of 110° Fahrenheit and then adding to it a saturated solution of chloride of zinc, agitating the mass, and then adding oil of turpentine and continuing the agitation until the turpentine is thoroughly incorporated, substantially as herein described.

3. The process of treating coal-tar, which consists in subjecting the tar in the vessel to a heat of 110° Fahrenheit, then drawing off said tar into a mixing-machine and adding, as the tar passes into said machine, a saturated solution of chloride of zinc, agitating the mass, and finally adding oil of turpentine, and continuing the agitation until the turpentine is thoroughly incorporated, substantially as herein described.

4. The process of treating coal-tar, which consists in subjecting the coal-tar to a heat of 110° Fahrenheit, maintaining that heat without driving off the lighter volatiles until the solids are melted to a degree sufficient to be acted upon by the solvents, adding a saturated solution of chloride of zinc in the proportion of two and one-half pounds to every fifty gallons of tar, and agitating the mass, then adding oil of turpentine during the agitation in the proportion of five gallons to every fifty gallons of tar, and continuing the agitation until the turpentine is thoroughly incorporated, substantially as herein described.

In witness whereof I have hereunto set my hand.

ANSON L. MUNSON.

Witnesses:
S. H. NOURSE,
H. C. LEE.